United States Patent [19]

Mizutani et al.

[11] Patent Number: 4,999,786

[45] Date of Patent: Mar. 12, 1991

[54] METHOD AND APPARATUS FOR MAKING INFERENCES USING FRAME-BASED KNOWLEDGE REPRESENTATION

[75] Inventors: Hiroyuki Mizutani, Yokohama, Japan; Takashi Moriyasu, Edinburgh, United Kingdom

[73] Assignee: Kabushiki Kaisha Toshiba, Kawasaki, Japan

[21] Appl. No.: 567,707

[22] Filed: Aug. 14, 1990

Related U.S. Application Data

[63] Continuation of Ser. No. 243,858, Sep. 13, 1988, abandoned.

[30] Foreign Application Priority Data

Sep. 16, 1987 [JP] Japan .................................. 62-231911

[51] Int. Cl.$^5$ ............................................. G06F 15/18
[52] U.S. Cl. .................................................... 364/513
[58] Field of Search ...................... 364/513, 200, 900

[56] References Cited

U.S. PATENT DOCUMENTS 4,675,829 6/1987 Clemenson ........................... 364/513
4,803,642 2/1988 Muranaga ............................ 364/513

OTHER PUBLICATIONS

R. Bruce Roberts et al.; The FRL Manual; Massachusetts Institute of Technology Artificial Intelligence Laboratory; Memo 409; Sep. 1977; pp. 1–18.

Primary Examiner—Allen R. MacDonald
Attorney, Agent, or Firm—Foley & Lardner

[57] ABSTRACT

A method and apparatus for making an inference using frame-based knowledge representation in which each slot is accompanied by information regarding a quantitative correspondence between its slot value and the frame to which it belongs. This makes an accurate comprehension of what can be inherited possible so an inference can be carried out with consistent accuracy.

11 Claims, 9 Drawing Sheets

SET OF RULES 3

| | | | | | | | |
|---|---|---|---|---|---|---|---|
| (1)( X | R(AA) | Y ) | → | ( $X_{sp}$ | R(FEA) | Y | ) |
| (2)( X | R(AA) | Y ) | → | ( X | R(FAE) | $Y_{sp}$ | ) |
| (3)( X | R(AA) | Y ) | → | ( $X_{sb}$ | R(AA) | Y | ) |
| (4)( X | R(AA) | Y ) | → | ( X | R(AA) | $Y_{sb}$ | ) |
| (5)( X | R(FAE)Y ) | | → | ( $X_{sp}$ | R(EE) | Y | ) |
| (6)( X | R(FAE)Y ) | | → | ( $X_{sb}$ | R(FAE) | Y | ) |
| (7)( X | R(FAE)Y ) | | → | ( X | R(FAE) | $Y_{sp}$ | ) |
| (8)( X | R(FEA)Y ) | | → | ( $X_{sp}$ | R(FEA) | Y | ) |
| (9)( X | R(FEA)Y ) | | → | ( X | R(EE) | $Y_{sp}$ | ) |
| (10)( X | R(FEA)Y ) | | → | ( X | R(FEA) | $Y_{sb}$ | ) |
| (11)( X | R(VAE)Y ) | | → | ( $X_{sp}$ | R(VAE) | Y | ) |
| (12)( X | R(VAE)Y ) | | → | ( X | R(EE) | $Y_{sp}$ | ) |
| (13)( X | R(VAE)Y ) | | → | ( X | R(VAE) | $Y_{sb}$ | ) |
| (14)( X | R(VEA)Y ) | | → | ( $X_{sp}$ | R(EE) | Y | ) |
| (15)( X | R(VEA)Y ) | | → | ( $X_{sb}$ | R(VEA) | Y | ) |
| (16)( X | R(VEA)Y ) | | → | ( X | R(VEA) | $Y_{sp}$ | ) |
| (17)( X | R(EE) | Y ) | → | ( $X_{sp}$ | R(EE) | Y | ) |
| (18)( X | R(EE) | Y ) | → | ( X | R(EE) | $Y_{sp}$ | ) |

FIG.3
(a)
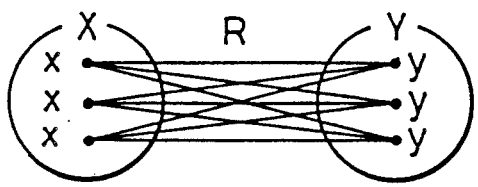
(X R(AA) Y)
$= \forall x \, \forall y \, (x \, R \, y)$
$= \forall y \, \forall x \, (x \, R \, y)$
(b)
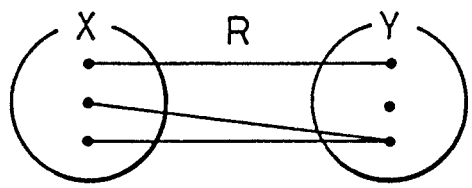
(X R(FAE) Y)
$= \forall x \, \exists y \, (x \, R \, y)$
(c)
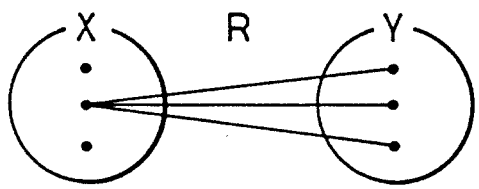
(X R(FEA) Y)
$= \exists x \, \forall y \, (x \, R \, y)$
(d)
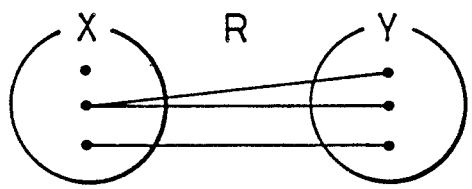
(X R(VAE) Y)
$= \forall y \, \exists x \, (x \, R \, y)$
(e)
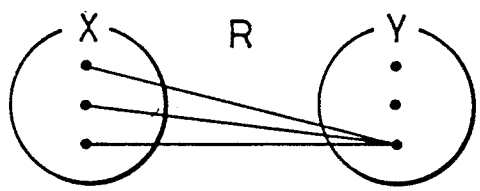
(X R(VEA) Y)
$= \exists y \, \forall x \, (x \, R \, y)$
(f)
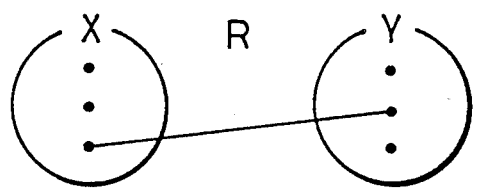
(X R(EE) Y)
$= \exists x \, \exists y \, (x \, R \, y)$
$= \exists y \, \exists x \, (x \, R \, y)$

FIG.4

SET OF RULES 1

| | | | |
|---|---|---|---|
| (1) | {X R(AA) Y} | → | {X R(FAE) Y} |
| (2) | {X R(AA) Y} | → | {X R(FEA) Y} |
| (3) | {X R(AA) Y} | → | {X R(VAE) Y} |
| (4) | {X R(AA) Y} | → | {X R(VEA) Y} |
| (5) | {X R(FAE) Y} | → | {X R(EE) Y} |
| (6) | {X R(FEA) Y} | → | {X R(EE) Y} |
| (7) | {X R(VAE) Y} | → | {X R(EE) Y} |
| (8) | {X R(VEA) Y} | → | {X R(EE) Y} |

FIG.5

SET OF RULES 2

| | | | |
|---|---|---|---|
| (1) | R(AA)  | → | $R^i$(AA)  |
| (2) | R(FAE) | → | $R^i$(VAE) |
| (3) | R(FEA) | → | $R^i$(VEA) |
| (4) | R(VAE) | → | $R^i$(FAE) |
| (5) | R(VEA) | → | $R^i$(FEA) |
| (6) | R(EE)  | → | $R^i$(EE)  |

FIG.6

SET OF RULES 3

| | | |
|---|---|---|
| (1) { X R(AA) Y } | → | ( $X_{sp}$ R(FEA) Y ) |
| (2) { X R(AA) Y } | → | ( X R(FAE) $Y_{sp}$ ) |
| (3) { X R(AA) Y } | → | ( $X_{sb}$ R(AA) Y ) |
| (4) { X R(AA) Y } | → | ( X R(AA) $Y_{sb}$ ) |
| (5) { X R(FAE) Y } | → | ( $X_{sp}$ R(EE) Y ) |
| (6) { X R(FAE) Y } | → | ( $X_{sb}$ R(FAE) Y ) |
| (7) { X R(FAE) Y } | → | ( X R(FAE) $Y_{sp}$ ) |
| (8) { X R(FEA) Y } | → | ( $X_{sp}$ R(FEA) Y ) |
| (9) { X R(FEA) Y } | → | ( X R(EE) $Y_{sp}$ ) |
| (10) { X R(FEA) Y } | → | ( X R(FEA) $Y_{sb}$ ) |
| (11) { X R(VAE) Y } | → | ( $X_{sp}$ R(VAE) Y ) |
| (12) { X R(VAE) Y } | → | ( X R(EE) $Y_{sp}$ ) |
| (13) { X R(VAE) Y } | → | ( X R(VAE) $Y_{sb}$ ) |
| (14) { X R(VEA) Y } | → | ( $X_{sp}$ R(EE) Y ) |
| (15) { X R(VEA) Y } | → | ( $X_{sb}$ R(VEA) Y ) |
| (16) { X R(VEA) Y } | → | ( X R(VEA) $Y_{sp}$ ) |
| (17) { X R(EE) Y } | → | ( $X_{sp}$ R(EE) Y ) |
| (18) { X R(EE) Y } | → | ( X R(EE) $Y_{sp}$ ) |

FIG.7
SET OF RULES 4
| | | |
|---|---|---|
| (1) ( X  R(AA) Y ) | ⟶ | ( X  S(AA)  Y ) |
| (2) ( X  R(FAE) Y ) | ⟶ | ( X  S(FAE) Y ) |
| (3) ( X  R(FEA) Y ) | ⟶ | ( X  S(FEA) Y ) |
| (4) ( X  R(VAE) Y ) | ⟶ | ( X  S(VAE) Y ) |
| (5) ( X  R(VEA) Y ) | ⟶ | ( X  S(VEA) Y ) |
| (6) ( X  R(EE)  Y ) | ⟶ | ( X  S(EE)  Y ) |
FIG.8
(a)
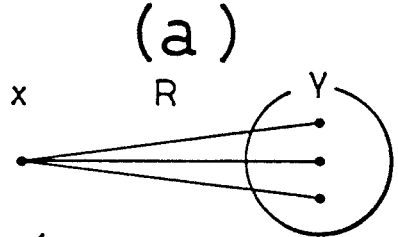
$(x\ R(A)\ Y) = \forall y(x\ R\ y)$
(b)
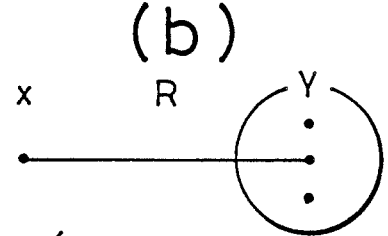
$(x\ R(E)\ Y) = \exists y(x\ R\ y)$
(c)
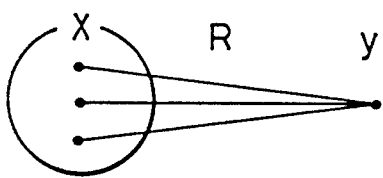
$(X\ R(A)\ y) = \forall x(x\ R\ y)$
(d)
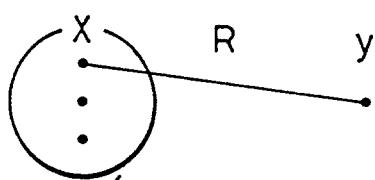
$(X\ R(E)\ y) = \exists x(x\ R\ y)$

FIG.9
SET OF RULES 5

| | | | |
|---|---|---|---|
| (1) | ( X R(AA) Y ) | → | ( x R(A) Y ) |
| (2) | ( X R(AA) Y ) | → | ( X R(A) y ) |
| (3) | ( X R(FAE) Y ) | → | ( x R(E) Y ) |
| (4) | ( X R(FEA) Y ) | → | ( X R(E) y ) |
| (5) | ( X R(VAE) Y ) | → | ( X R(E) y ) |
| (6) | ( X R(VEA) Y ) | → | ( x R(E) Y ) |
| (7) | ( x R(A) Y ) | → | ( X R(FEA) Y ) |
| (8) | ( x R(A) Y ) | → | ( x R y ) |
| (9) | ( x R(E) Y ) | → | ( X R(EE) Y ) |
| (10) | ( X R(A) y ) | → | ( X R(FAE) Y ) |
| (11) | ( X R(A) y ) | → | ( x R y ) |
| (12) | ( X R(E) y ) | → | ( X R(EE) Y ) |
| (13) | ( x R y ) | → | ( X R(E) y ) |
| (14) | ( x R y ) | → | ( x R(E) Y ) |

FIG.10
SET OF RULES 6

| | | | |
|---|---|---|---|
| (1) | ( x R(A) Y ) | → | ( x S(A) Y ) |
| (2) | ( X R(A) y ) | → | ( X S(A) y ) |
| (3) | ( x R(E) Y ) | → | ( x S(E) Y ) |
| (4) | ( X R(E) y ) | → | ( X S(E) y ) |

METHOD AND APPARATUS FOR MAKING INFERENCES USING FRAME-BASED KNOWLEDGE REPRESENTATION

This application is a continuation of application Ser. No. 07/243,858, filed Sept. 13, 1988, now abandoned.

BACKGROUND OF THE INVENTION

1. Field of the Invention

The present invention relates to method and apparatus for making inferences, using frame-based knowledge representation primarily utilized in artificial intelligence technology, in which various knowledge about an object of interest is collectively stored in frames, and inferences are made utilizing hierarchical data structure formed by the frames interactively.

2. Description of the Prior Art

A method known as frame-based knowledge representation is an effective way of representing knowledge of various kind in a flexible manner which allows easy access, management, and utilization of the knowledge.

In this frame-based knowledge representation, an object is represented by a frame comprised of slot - slot value pairs. Each slot represents a categorized character and each slot-value represents a particular character value corresponding to the object being represented. An example of such frame-based knowledge representation is shown diagrammatically in FIG. 1, where a frame is shown as a rectangular box with a frame name such as 'computer' or 'processor' given on the upper side of each box. Labels given inside each box such as 'super' or 'sub' are slots, and those accompanying each slot (following : symbol) such as 'personal computer' or 'microcomputer' are slot values. In a given frame representing a certain object, a slot 'super' indicates a broader concept of the object, a slot 'sub' indicates a narrower concept of the object, a slot 'has part' indicates a component of the object, a slot 'has-instance' indicates an example of the object, a slot 'part-of' indicates what the object is a component of, and a slot 'instance-of' indicates what the object is an example of.

In an apparatus for making inferences using such frame-based knowledge representations in a knowledge base, if a required character value of an object was not found in a frame representing the object, the character value is inferred by so-called inheritance, i.e., a slot value of a slot belonging to a frame representing a broader concept of the object and representing the same character as that of the required character value is regarded as the required character value of the object. For instance, in the example shown in FIG. 1, if a question asked was 'Does a business personal computer have a microprocessor as a component ?', then a frame 'business personal computer' is looked up first. But as there is no slot 'has-part' found in that frame, a frame 'personal computer' which represents a broader concept is looked up next. As there is a slot 'has-part' in this frame with a slot value 'microprocessor', this slot value is inherited by the frame 'business personal computer' as the character value needed, and an answer 'true' will be given to the original question.

As in this example, the inheritance conventionally has been an unrestricted transferring of a slot—slot value pair of a frame representing the broader concept to a frame representing the narrower concept. However, there is trouble with this manner of the inheritance in the following circumstance. In an example shown in FIG. 1, if a question asked was 'What is 4 bMP (4 bit microprocessor) a component of ?', then as there is no slot 'part-of' found in the frame '4 bMP', the pair of the slot 'part-of' and a slot value 'personal computer' in a frame 'microprocessor' which represents a broader concept of 4 bMP will be inherited down to the frame '4 bMP', and an answer '4 bMP is a component of a personal computer' will be inferred. The trouble is that this answer contradicts our common knowledge. The source of this trouble is that it is not that a personal computer has all the microprocessors as its components as the process of the inference in this example appears to interpret, but that a personal computer in general has some kind of a microprocessor as its component. In other words, 'microprocessor' appearing in the frame 'personal computer' does not necessarily corresponds one-to-one with a general notion of microprocessor.

Thus the conventional mechanism of inheritance in frame-based knowledge representation has a problem in not being able to distinguish differences in ranges of certain concepts and different senses of hierarchical relationships among frames representing such concepts, and this may induce incorrect inferences.

SUMMARY OF THE INVENTION

It is therefore an object of the present invention to provide a method of making inferences using frame-based knowledge representation which can infer correct answers regardless of the presence of differences in ranges of certain concepts and different senses of hierarchical relationships among frames representing such concepts.

It is another object of the present invention to provide an apparatus capable of carrying out the method of making inferences according to the present invention.

According to one aspect of, the present invention there is provided an apparatus for making inferences using frame-based knowledge representation, comprising a knowledge base means including frames comprised of slots and slot values for storing knowledge on objects of interest, each object being represented by a frame, each categorized character being represented by a slot in the frame, a particular character value corresponding to the object being represented by a slot value in the frame, and each slot being accompanied by information regarding a quantitative correspondence between its slot value and the frame to which it belongs; and an inference means for deducing an answer to a question by utilizing frames and slots of the knowledge base means interactively while maintaining quantitative correspondences among frames and slot values given by the information accompanying slots.

According to another aspect of the present invention there is provided a method of making inferences using frame-based knowledge representation, comprising the steps of (a) representing each object of interest by a frame, (b) representing each categorized character of an object by a slot in a frame representing the object, (c) representing each character value corresponding to an object by a slot value in a frame representing the object, (d) accompanying each slot with information regarding a quantitative correspondence between its slot value and the frame to which it belongs, (e) deducing an answer to a question by utilizing frames and slots interactively while maintaining the quantitative correspondences among slot values and frames given by the information accompanying slots.

The other features and advantages of the present invention will become apparent from the following descriptions taken in conjunction with the accompanying drawings.

BRIEF DESCRIPTION OF THE DRAWINGS

FIG. 3 is a diagram for explaining possible quantitative correspondences in a method of making inferences using frame-based knowledge representation according to the present invention.

FIG. 4 is a table for explaining rules to be obeyed in a method of making inferences using frame-based knowledge representation according to the present invention.

FIG. 5 is a table for explaining rules to be obeyed in a method of making inferences using frame-based knowledge representation according to the present invention.

FIG. 6 is a table for explaining rules to be obeyed in a method of making inferences using frame-based knowledge representation according to the present invention.

FIG. 7 is a table for explaining rules to be obeyed in a method of making inferences using frame-based knowledge representation according to the present invention.

FIG. 8 is a diagram for explaining possible quantitative correspondences in a method of making inferences using frame-based knowledge representation according to the present invention.

FIG. 9 is a table for explaining rules to be obeyed in a method of making inferences using frame-based knowledge representation according to the present invention.

FIG. 10 is a table for explaining rules to be obeyed in a method of making inferences using frame-based knowledge representation according to the present invention.

DETAILED DESCRIPTION OF THE PREFERRED EMBODIMENT

Figure 1:
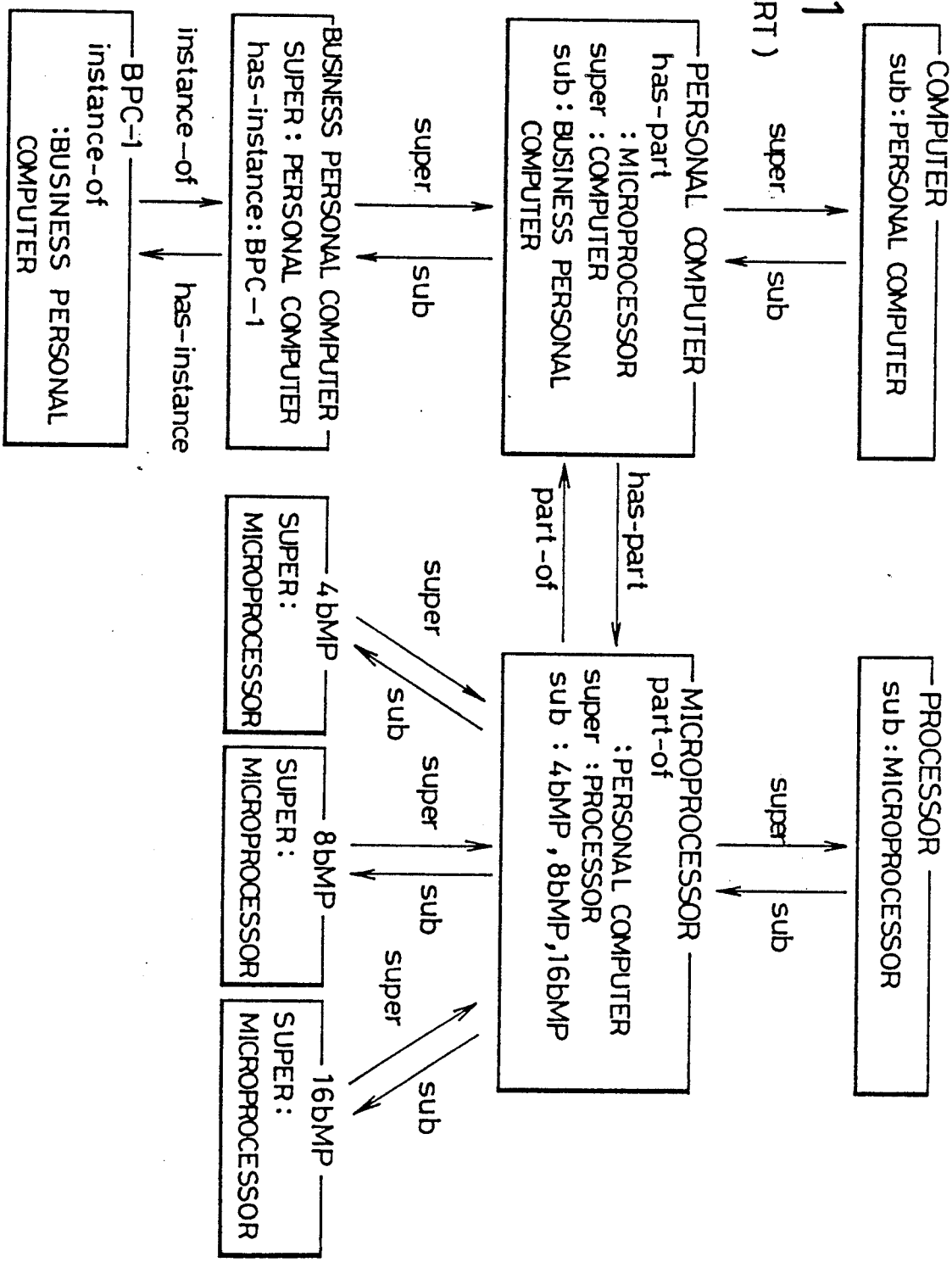
FIG. 1 is a diagrammatic illustration of an example of frame-based knowledge representation in the prior art.
Figure 2:
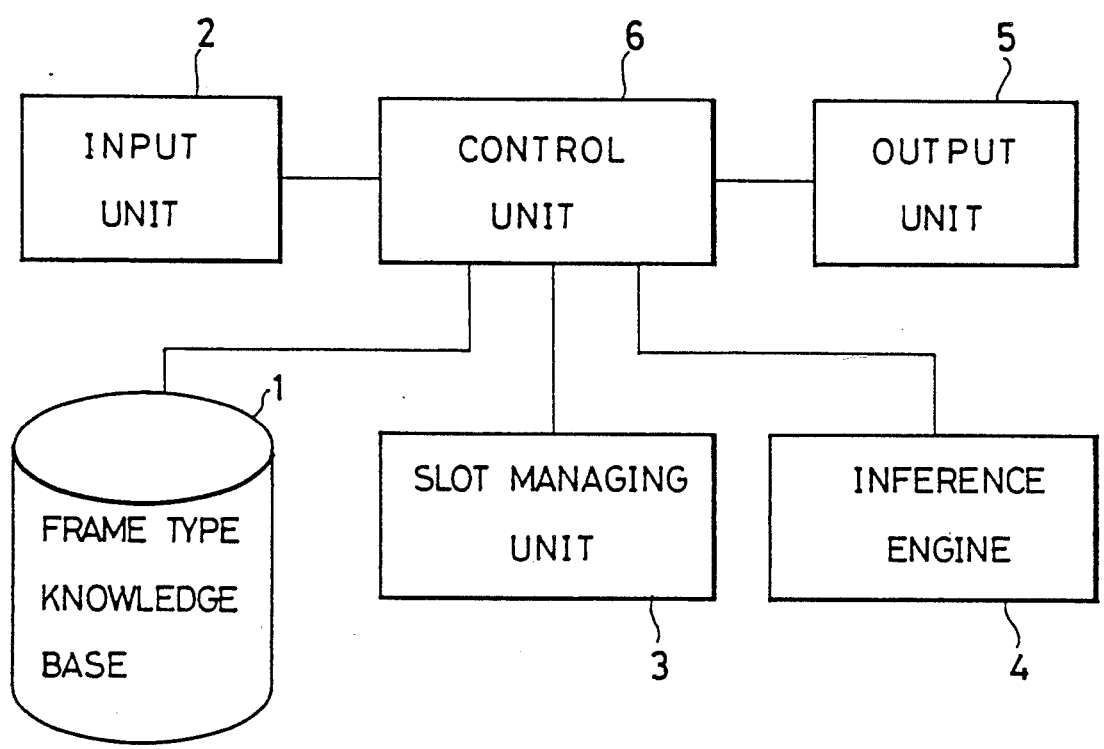
FIG. 2 is a block diagram of an apparatus for making inferences using frame-based knowledge representation according to the present invention.

Referring now to FIG. 2, there is shown one embodiment of an apparatus for making inferences using frame-based knowledge representation according to the present invention. In this embodiment, the apparatus is comprised of a frame type knowledge base 1 including frames comprised of pairs of slots and slot values, each slot being accompanied by a quantifier facet for storing information referred hereafter as a limiting operator which indicates a quantitative correspondence between slot values and frames, for storing knowledge about objects of interest, an input unit 2 for enabling users to initiate annexation, modification, or inquiry concerning frames, slots, slot values, or limiting operators in the frame type knowledge base 1, a slot managing unit 3 for managing the same types of slots accompanied by different types of limiting operators together in accordance with inputs at the input unit 2, or hierarchical relationships among slots, an inference engine 4 for carrying out inferences in accordance with inputs at input unit 2, by utilizing relevant slots and frames according to the rules for making inferences to be explained in detail below, an output unit 5 for indicating results of inferences made, and a control unit 6 for controlling operations of other components of the apparatus mentioned above.

A detailed explanation of the limiting operators involved in this embodiment and the aforementioned rules for making inferences which govern inferences using these limiting operators will now be given referring to FIGS. 3 to 10. In the following, the fact that in the frame X the slot R has the slot value Y will be denoted by the symbol

[X R Y]

and, a certain instance of a class of representations X will be denoted as a certain instance of a class of representations Y will be denoted as Y.

Now [X R Y] is to be interpreted as meaning that X and Y have a relation R. There are six distinct relationships of quantitative correspondence relevant here, as shown in FIG. 3. A limiting operator in a quantifier facet of a slot designates a type of quantitative correspondence its slot value is to have with respect to the frame to which it belongs. More specifically, the case of FIG. 3(a) is where every x in X has a relation R with every y in Y, or vice versa, which will be designated in a quantifier facet as AA. The case of FIG. 3(b) is where every in X has a relation R with some y in Y but not with others in Y, which will be designated in a quantifier facet as FAE. The case of FIG. 3(c) is where every y in Y has a relation R only with a certain in X, which will be designated in a quantifier facet as FEA. The case of FIG. 3(d) is where every Y in Y has a relation R with some x in X but not with others in X, which will be designated in a quantifier facet as VAE. The case of FIG. 3(e) is where every x in X has a relation R only with a certain y in Y, which will be designated in a quantifier facet as VEA. Finally, the case of FIG. 3(f) is where only a certain x in X has a relation R only with a certain y in Y, which will be designated in a quantifier facet as EE. In the following, a slot R with AA, FAE, FEA, VAE, VEA, or EE given in a quantifier facet will be denoted as R(AA), R(FAE), R(FEA), R(VAE), R(VEA), or R(EE), respectively.

With these designations of the relationships given in the quantifier facets of the slots, the rules for making inferences shown in FIG. 4 to 7 will be imposed on the processes of making inferences.

FIG. 4 shows the first set of rules which indicates that if a slot R has AA in its quantifier facet, then questions involving the slot R with any of FAE, FEA, VAE, or VEA in the quantifier facet can be answered 'true', and if a slot R has any of FAE, FEA, VAE, or VEA in its quantifier facet, then questions involving the slot R with EE in the quantifier facet can be answered 'true'.

FIG. 5 shows the second set rules. Here, for a slot R there is a slot $R^i$ such that

[x R y ]⟶[y Ri x ]

then such a slot $R^i$ will be called the inverse slot of the slot R. The second set of rules shown in FIG. 5 applies to such inverse slots and indicates that if a slot R has AA, FAE, FEA, VAE, VEA, or EE in its quantifier facet, then its inverse slot $R^i$ must have AA, VAE, VEA, FAE, FEA, or EE, respectively, in its quantifier facet.

FIG. 6 shows the third set of rules. Here, Xsp denotes a frame which is 'super' of a frame X, Ysp denotes a frame which is 'super' of a frame Y, Xsb denotes a frame which is 'sub' of a frame X, and Ysb denotes a frame which is 'sub' of a frame Y. The third set of rules shown in FIG. 6 applies to such slots and indications of these rules can be deciphered in the manner similar to that of the first set of rules shown in FIG. 4. By these rules, incorrect inferences such as

[X R(FEA) Y] ⟶ [Xsb R(FEA) Y]

[X R(VAE) Y] ⟶ [Xsb R(VAE) Y]

[X R(EE) Y] ⟶ [Xsb R(EE) Y]

are excluded.

FIG. 7 shows the fourth set of rules which applies to a slot S such that

[x R y] ⟶ [x S y]

holds. Indications of these rules can also be deciphered in a manner similar to that of the first set of rules shown in FIG. 4.

As for relationships between an instance x of X and Y, or an instance y of Y and X, there are four distinct relationships of quantitative correspondence relevant here, as shown in FIG. 8. The case of FIG. 8(a) is where an instance x has a relation R with every y in Y, which will be designated in the quantifier facet as A. The case of FIG. 8(b) is where an instance x has a relation R only with a certain y in Y, which will be designated in the quantifier facet as E. The case of FIG. 8(c) is where an instance y has a relation R with every x in X, which will be designated in the quantifier facet as A again. Finally, the case of FIG. 8(d) is where an instance y has a relation R only with a certain x in X, which will be designated in the quantifier facet as E again. In the following, a slot R with A, or E given in the quantifier facet will be denoted as R(A), or R(E), respectively.

With these designations of the relationships given in the quantifier facets of the slots, the rules for making inferences, shown in FIG. 9 and 10 will be imposed on processes of making inferences.

FIG. 9 shows the fifth set of rules. Indications of these rules can again be deciphered in a manner similar to that of the first set of rules shown in FIG. 4. By these rules, incorrect inferences such as

[X R(FEA) Y] ⟶ [x R(E) Y]

[X R(VAE) Y] ⟶ [x R(E) Y]

[X R(EE) Y] ⟶ [x R(E) Y]

[X R(E) y] ⟶ [x R y]

are excluded.

FIG. 10 shows the sixth set of rules which applies to a slot S such that

[x R y] ⟶ [x S y]

holds. Indications of these rules can also be deciphered in a manner similar to that of the first set of rules shown in FIG. 4.

An example of a process of making an inference using these rules will now be described referring to FIG. 11.

Figure 11:
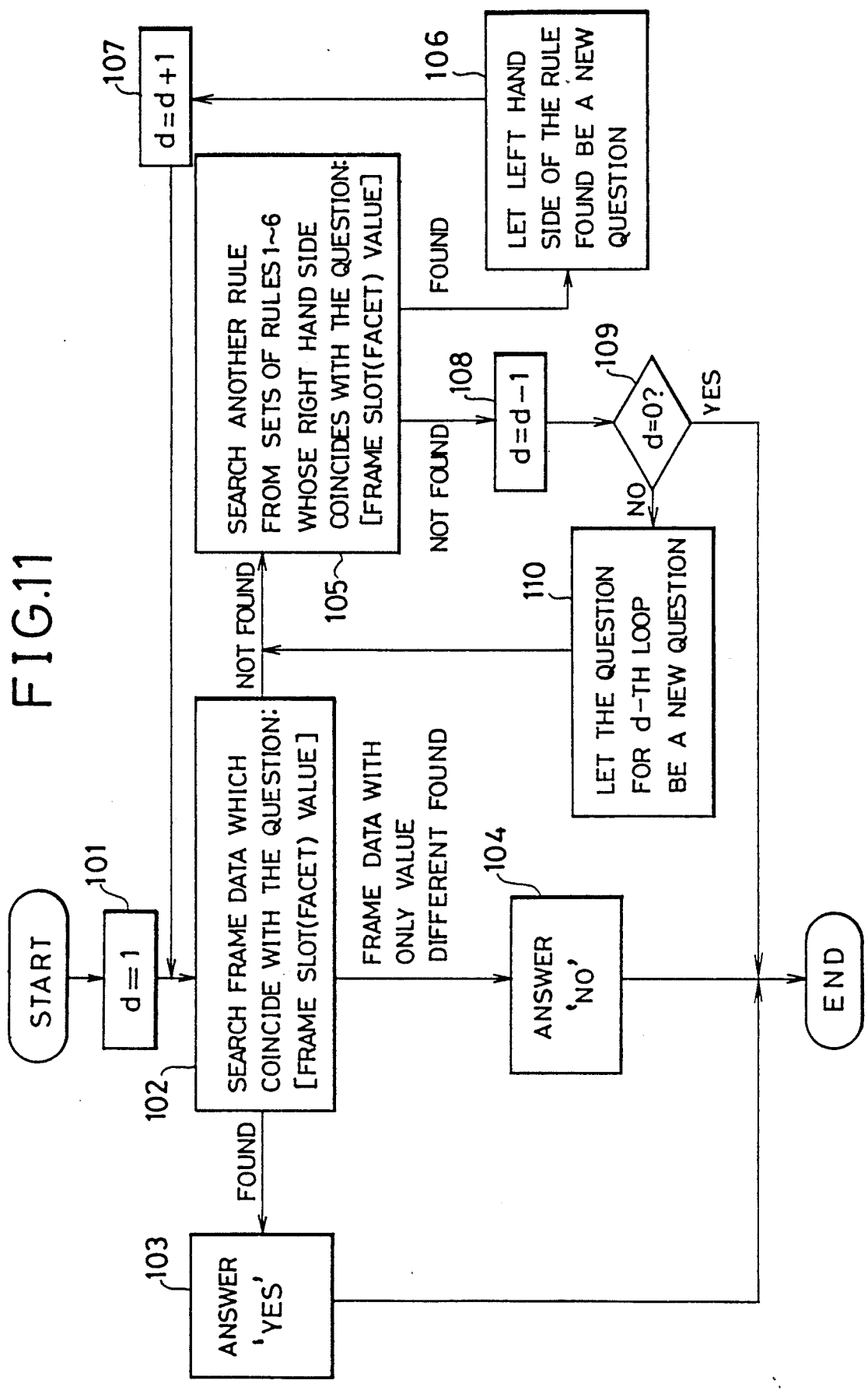
FIG. 11 is a flow chart for an example of a process of making inferences according to the present invention.

FIG. 11 shows an example of a process of making an inference where either answer 'yes' or 'no' will be inferred for a question asked in a form

[FRAME SLOT(FACET) VALUE]

where FACET stands for the quantifier facet and VALUE stands for the slot value.

At step 101, a counter d which counts the number of loop operations performed is set equal to one. At step 102, data in frames (frame data in FIG. 11) are searched to find one example which coincide with the question. If such data are found, an answer 'yes' will be given to the question at step 103, and the process terminates If data which coincide with the question in FRAME and SLOT(FACET) but differs in VALUE are found, an answer 'no' will be given to the question at step 104, and the process terminates. If no such data mentioned so far are found, then step 105 will be taken. At step 105, sets of rules for making inferences 1–6 explained above are searched to find a rule whose right hand side coincides with the question. If such a rule is found, then its left hand side will be regarded as a new question at step 106, and this new question will be labeled by the value of the counter d increased by one from that for the previous question at step 107, and then step 102 will be repeated for this new question. If no such rule is found at step 105, then the value of the counter d will be reduced by one at step 108, and whether d is equal to zero is determined at step 109. If d is not equal to zero, the question labeled by that value of the counter d will be regarded as a new question at step 110, and then step 105 will be repeated to rules which were not yet searched for the question. If d is equal to zero, the process terminates.

An example of inference by this embodiment of the present invention will now be explained referring to FIG. 12.

Figure 12:
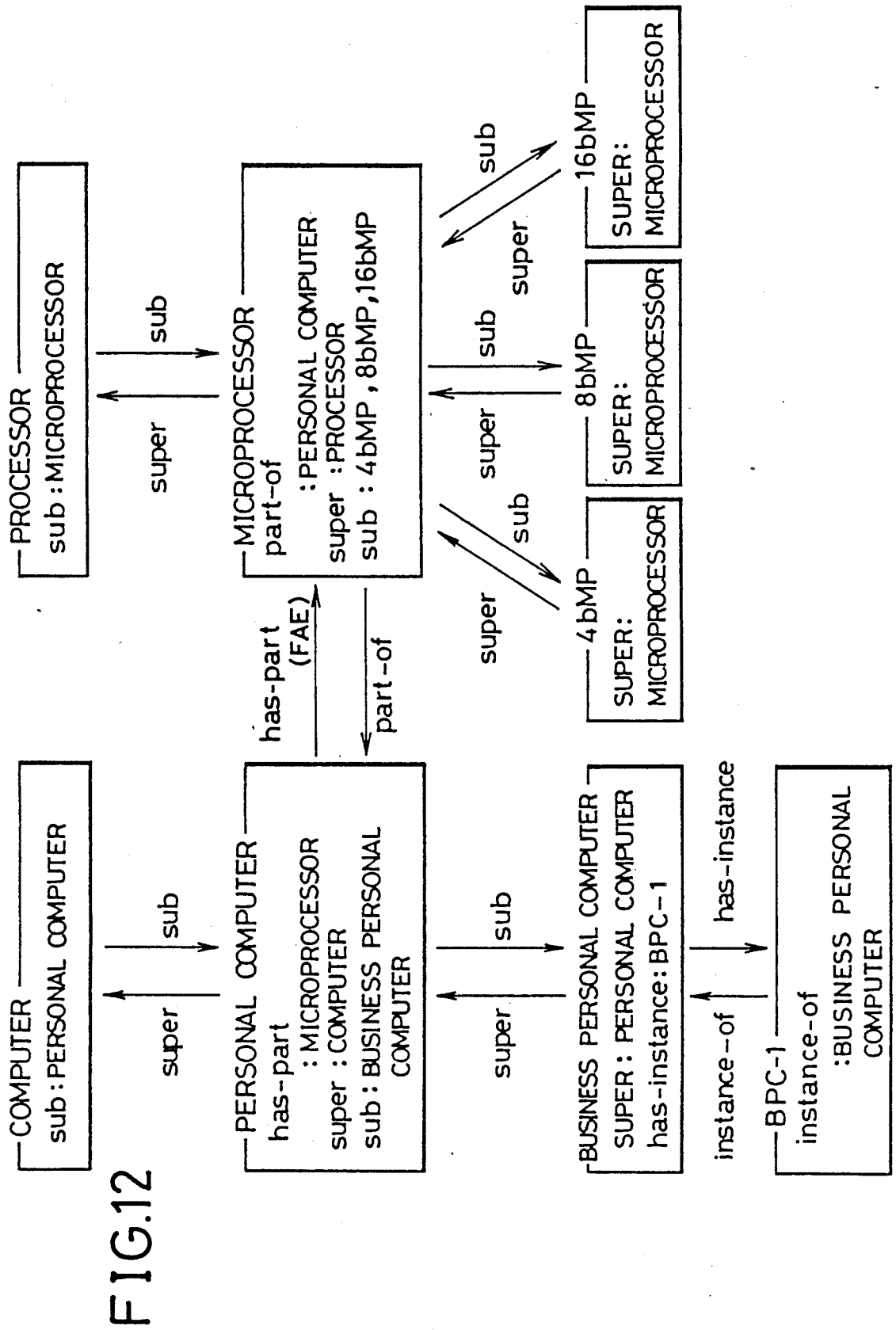
FIG. 12 is a diagrammatic illustration of an example of frame-based knowledge representation according to the present invention.

FIG. 12 diagrammatically shows an example of frame-based knowledge representation in the frame type knowledge base 1 of FIG. 2. In this example, a frame 'computer' is shown as a broader concept of a frame 'personal computer', a frame 'business personal computer' is shown as a narrower concept of the frame 'personal computer', a frame 'BPC-1' is shown as an instance of the frame 'business personal computer', a 'frame microprocessor'is shown as a component of the frame 'personal computer', a frame 'processor' is shown as a broader concept of the frame 'microprocessor', and a frame '4 bMP'(4 bit microprocessor), a frame '8 bMP'(8 bit microprocessor), and a frame '16 bMP'(16 bit microprocessor) are shown as narrower concepts of the frame 'microprocessor'.

In addition, the fact that a slot 'has-part' in the frame 'personal computer' has FAE in its quantifier facet is indicated in FIG. 11. This indicates the correct interpretation of this relationship that every personal computer has some kind of a microprocessor as its component. By means of this, to a question

[personal computer has-part(FAE) microprocessor]

(Does every personal computer have some kind of a microprocessor as its component?) an answer 'yes' will be given. While, to a question

[personal computer has-part(EE) microprocessor]

(Does some personal computers have some kind of a microprocessor as its component?) an answer 'yes' will be given by rule 1-(6) of FIG. 4.

As for a slot 'part-of' which is the inverse slot of the slot 'has-part', since VAE will be given in its quantifier facet by rule 2-(2) of FIG. 5, to a question

[microprocessor part-of(VAE) personal computer]

(Does some kind of a microprocessor form a component of every personal computer?) an answer 'yes' will be given. While to a question

[microprocessor part-of(EE) personal computer]

(Does some kind of a microprocessor° a component of some personal computers?) an answer 'yes' will be given by the rules 1-(7) of FIG. 4 and 2-(2) of FIG. 5.

Similarly, for frame 'computer'
[computer has-part(EE) microprocessor]

(Some computers have some kind of a microprocessor as a component) can be inferred by the rule 3-(5) of FIG. 6.

And for the frame 'business personal computer'

[business personal computer has-part(FAE) microprocessor]

(Every business personal computer has some kind of a microprocessor as a component) can be inferred by rule 3-(6) of FIG. 6.

Likewise, for the frame 'processor'

[personal computer has-part(FAE) processor]

(Every personal computer has some kind of a processor as a component) can be inferred by rule 3-(7) of FIG. 6.

Also, for the frame 'BPC-1'

[BPC-1 has-part(E) microprocessor]

(BPC-1 has some kind of a microprocessor as a component) can be inferred by rule 5-(3) of FIG. 9

On the other hand, no inference will be carried out for the frames '4 bMP', '8 bMP', and '16 bMP' as there is no rule appropriate for them.

Meanwhile, by defining 'has' as a wider relationship of 'has-part' so that

[x has-part y] → [x has y]

holds, then

[personal computer has(FAE) microprocessor]

(Every personal computer has some kind of a microprocessor) can be inferred by rule 4-(2) of FIG. 7.

Similarly,

[BPC-1 has(E) microprocessor]

(BPC-1 has some kind of a microprocessor) can be inferred by rules 5-(3) of FIG. 9 and 6-(3) of FIG. 10.

Furthermore, in this embodiment of the present invention, due to the fact that the relationships of quantitative correspondence between objects are specified, it becomes possible to reverse the direction of the inferences which,. has not been possible in the conventional apparatus for making inferences. For example, to a question

[processor part-of(VAE) ?]

(Every what has some kind of a processor as a component?) an answer 'personal computer' can be inferred by backward inference using the rules 3-(11) of FIG. 6 and 2-(2) of FIG. 5.

As has been described so far using a particular example, according to the present invention, numerous kind of inferences including those which have not been possible heretofore become available, with consistently correct results, by means of the information accompanying slots indicating types of relationships of quantitative correspondence between objects which enable the accurate comprehension of what can be inherited.

Moreover, according to the present invention, the advantage of frame-based knowledge representation pertaining to the flexibility of representation of knowledge will be retained completely, as it is not necessary to specify the inheritance as procedures.

It can easily be appreciated that although the preferred embodiment has been described as employing the slot managing unit 3 for conducting the processes of making inference using the rules for making inferences, these rules can be implemented as hardware inside the inference engine 4.

Besides this, many modifications and variations of this embodiment may be made without departing from the novel and advantageous features of this invention. Accordingly, all such modifications and variations are intended to be included within the scope of the appended claims.

What is claimed is:

1. An apparatus for making an inference using frame-based knowledge representation, comprising:
    knowledge base means including frames comprised of slots and slot values for storing knowledge about objects of interest, each object of said objects being represented by a frame, each categorized character of said each object being represented by a slot in said frame, a particular character value corresponding to said each object being represented by a slot value in said frame, and each slot being accompanied by information regarding a quantitative correspondence between its slot value and the frame to which it belongs; and
    inference means for deducing an answer to a question by utilizing frames and slots of said knowledge base means interactively, in which quantitative correspondences among frames and slot values given by said information accompanying slots are utilized to determine possible referencing relationships between each frame and slot.

2. The apparatus of claim 1, wherein said inference means is comprised of:
    slot managing means for managing said slots of said knowledge base means in accordance with prescribed rules for correcting said information accompanying said slots as needed in processes of making inferences; and inference engine means for carrying out inferences by utilizing said frames and said slots of said knowledge base means interactively under the guidance of said slot managing means.

3. The apparatus of claim 1 wherein said inference means is comprised of inference engine means equipped with a mechanism for correcting said information accompanying said slots as needed in processes of making inferences.

4. The apparatus of claim 1, wherein said information accompanying said slots includes, for a first class of representations of objects and a second class of representations of objects:

(a) a case where every instance of said first class has a certain relationship indicated by a particular type of slot with some instances of said second class, but not with other instances of said second class;

(b) a case where every instance of said second class has a certain relationship indicated by a particular type of slot with some instances of said first class, but not with the other instances of said first class.

5. The apparatus of claim 4, wherein said information accompanying said slots further includes, for said first class of representations of objects and said second class of representations of objects:

(c) a case where every instance of said first class has a certain relationship indicated by a particular type of slot with all instances of said second class;

(d) a case where every instance of said second class has a certain relationship indicated by a particular type of slot only with a certain instance of said first class;

(e) a case where every instance of said first class has a certain relationship indicated by a particular type of slot only with a certain instance of said second class;

(f) a case where only some instances of said first class have a certain relationship indicated by a particular type of slot only with some instances of said second class.

6. The apparatus of claim 5, wherein said information accompanying said slots further includes, for said first class of representations of objects and said second class of representations of objects:

(g) a case where a certain instance of said first class has a certain relationship indicated by a particular type of slot with all instances of said second class;

(h) a case where a certain instance of said first class has a certain relationship indicated by a particular type of slot only with a certain instance of said second class;

(i) a case where a certain instance of said second class has a certain relationship indicated by a particular type of slot with all instances of said first class;

(j) a case where a certain instance of said second class has a certain relationship indicated by a particular type of slot only with a certain instance of said first class.

7. A computer implemented method of making an inference using frame-based knowledge representation, comprising the steps of:

(a) representing each object of interest by a frame;

(b) representing each categorized character of said object by a slot in said frame representing said object;

(c) representing each character value corresponding to said object by a slot value in said frame representing said object;

(d) accompanying each slot with information regarding a quantitative correspondence between its slot value and a frame to which it belongs;

(e) deducing an answer to a question by utilizing frames and slots interactively, in which quantitative correspondences among frames and slots values given by said information accompanying slots are utilized to determine possible referencing relationships between each frame and slot.

8. The method of claim 7, further including the step;

(f) correcting said information accompanying slots as needed in processes of making inferences.

9. The method of claim 7, wherein said information accompanying slots includes, for a first class of representations of objects and a second class of representations of objects:

(a) a case where every instance of said first class has a certain relationship indicated by a particular type of slot with some instances of said second class, but not with the other instances of said second class;

(b) a case where every instance of said second class has a certain relationship indicated by a particular type of slot with some instances of said first class, but not with the other instances of said first class.

10. The method of claim 7, wherein said information accompanying slots further includes, for a class of representations of objects a first class and a second class of representations of objects:

(c) a case where every instance of said first class has a certain relationship indicated by a particular type of slot with all instances of said second class;

(d) a case where every instance of said second class has a certain relationship indicated by a particular type of slot only with a certain instance of said first class;

(e) a case where every instance of said first class has a certain relationship indicated by a particular type of slot only with a certain instance of said second class;

(f) a case where only some instances of said first class have a certain relationship indicated by a particular type of slot only with some instances of said second class.

11. The method of claim 7, wherein said information accompanying slots further includes, for a first class of representations of objects and a second class of representations of objects:

(g) a case where a certain instance of said first class has a certain relationship indicated by a particular type of slot with all instances of said second class;

(h) a case where a certain instance of said first class has a certain relationship indicated by a particular type of slot only with a certain instance of said second class;

(i) a case where a certain instance of said second class has a certain relationship indicated by a particular type of slot with all instances of said first class;

(j) a case where a certain instance of said second class has a certain relationship indicated by a particular type of slot only with a certain instance of said first class.

* * * * *